(12) United States Patent
Maguire

(10) Patent No.: US 12,479,327 B2
(45) Date of Patent: Nov. 25, 2025

(54) TRACTION BATTERY PACK CELL STACK REMOVAL METHOD AND BATTERY PACK ASSEMBLY

(71) Applicant: Ford Global Technologies, LLC, Dearborn, MI (US)

(72) Inventor: Patrick Daniel Maguire, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 537 days.

(21) Appl. No.: 17/870,180

(22) Filed: Jul. 21, 2022

(65) Prior Publication Data

US 2023/0302950 A1  Sep. 28, 2023

Related U.S. Application Data

(60) Provisional application No. 63/322,766, filed on Mar. 23, 2022.

(51) Int. Cl.
| | |
|---|---|
| *B60K 1/04* | (2019.01) |
| *B60L 50/64* | (2019.01) |
| *B60L 53/80* | (2019.01) |
| *B60R 16/04* | (2006.01) |
| *H01M 10/04* | (2006.01) |
| *H01M 50/204* | (2021.01) |

(52) U.S. Cl.
CPC ............ *B60L 53/80* (2019.02); *B60K 1/04* (2013.01); *B60L 50/64* (2019.02); *B60R 16/04* (2013.01); *H01M 10/0481* (2013.01); *H01M 50/204* (2021.01); *H01M 2220/20* (2013.01)

(58) Field of Classification Search
CPC .......... B60K 1/04; B60L 53/80; B60L 50/64; H01M 10/0481; H01M 50/204; H01M 2220/20
See application file for complete search history.

(56) References Cited

U.S. PATENT DOCUMENTS

| | | | |
|---|---|---|---|
| 5,037,711 A | 8/1991 | Bonnaud et al. | |
| 5,806,618 A | 9/1998 | Luode | |
| 8,089,248 B2 | 1/2012 | Tabatowski-Bush | |
| 8,968,912 B2 | 3/2015 | Maguire et al. | |
| 9,217,781 B2 | 12/2015 | Tabatowski-Bush et al. | |
| 9,425,628 B2 | 8/2016 | Pham et al. | |
| 9,446,680 B2 | 9/2016 | Chen et al. | |
| 9,515,357 B2 | 12/2016 | Haskins et al. | |
| 9,799,932 B2 | 10/2017 | Haskins et al. | |
| 10,109,897 B2 | 10/2018 | Haskins et al. | |

(Continued)

FOREIGN PATENT DOCUMENTS

| | | |
|---|---|---|
| CN | 101860053 A | 10/2010 |
| CN | 101860053 B | 4/2015 |

(Continued)

*Primary Examiner* — Jason D Shanske
*Assistant Examiner* — James J Triggs
(74) *Attorney, Agent, or Firm* — David B. Kelley; Carlson, Gaskey & Olds, P.C.

(57) ABSTRACT

A battery pack cell stack removal method includes compressing a cell stack with an enclosure structure when the cell stack is received within a cell-receiving opening of the enclosure structure, and pulling a cell stack removal strap to withdrawn the cell stack from the cell-receiving opening of the enclosure structure.

20 Claims, 7 Drawing Sheets

(56) References Cited

U.S. PATENT DOCUMENTS

| | | | |
|---|---|---|---|
| 10,566,647 B2 * | 2/2020 | Andryukov | H01M 50/293 |
| 10,601,006 B2 | 3/2020 | Maguire et al. | |
| 10,608,222 B2 | 3/2020 | Montgomery et al. | |
| 10,759,281 B2 | 9/2020 | Miller et al. | |
| 10,784,495 B2 | 9/2020 | Fernandez-Galindo et al. | |
| 11,005,131 B2 | 5/2021 | Zhou et al. | |
| 11,024,913 B2 | 6/2021 | Subramanian et al. | |
| 11,050,125 B1 | 6/2021 | Zhu et al. | |
| 11,114,726 B2 | 9/2021 | Gu et al. | |
| 11,128,009 B2 | 9/2021 | Chen et al. | |
| 11,139,537 B2 | 10/2021 | Wu et al. | |
| 11,217,847 B2 | 1/2022 | Eftekhari et al. | |
| 11,258,119 B2 | 2/2022 | Wang et al. | |
| 11,264,669 B2 | 3/2022 | Jiang | |
| 11,283,130 B2 | 3/2022 | Chen et al. | |
| 11,289,750 B2 | 3/2022 | Zhou et al. | |
| 11,302,972 B2 | 4/2022 | Chu et al. | |
| 11,302,973 B2 | 4/2022 | Maguire et al. | |
| 11,302,990 B2 | 4/2022 | Huang et al. | |
| 11,329,347 B2 | 5/2022 | Huang et al. | |
| 11,335,960 B2 | 5/2022 | Wang et al. | |
| 11,362,392 B2 | 6/2022 | Wang et al. | |
| 11,362,393 B2 | 6/2022 | Wang et al. | |
| 11,387,519 B2 | 7/2022 | Huang et al. | |
| 11,404,744 B1 | 8/2022 | Yang et al. | |
| 11,417,932 B2 | 8/2022 | Tang et al. | |
| 11,417,936 B2 | 8/2022 | Wang et al. | |
| 2010/0112424 A1 | 5/2010 | Hayashi | |
| 2010/0259221 A1 | 10/2010 | Tabatowski-Bush | |
| 2013/0164592 A1 | 6/2013 | Maguire et al. | |
| 2017/0104251 A1 | 4/2017 | Wang | |
| 2019/0305389 A1 | 10/2019 | Poirier et al. | |
| 2020/0091494 A1 | 3/2020 | Fernandez-Galindo et al. | |
| 2020/0203684 A1 | 6/2020 | Chen et al. | |
| 2020/0203779 A1 | 6/2020 | Wang et al. | |
| 2020/0212387 A1 | 7/2020 | Su et al. | |
| 2020/0212397 A1 | 7/2020 | Wang et al. | |
| 2020/0212418 A1 | 7/2020 | Chen et al. | |
| 2020/0381697 A1 | 12/2020 | Fernandez-Galindo et al. | |
| 2021/0066686 A1 | 3/2021 | Siewert et al. | |
| 2021/0091348 A1 | 3/2021 | Lateef et al. | |
| 2021/0091437 A1 | 3/2021 | Chen et al. | |
| 2021/0104798 A1 | 4/2021 | Jiang et al. | |
| 2021/0119279 A1 | 4/2021 | Wang et al. | |
| 2021/0218117 A1 | 7/2021 | Zhu et al. | |
| 2021/0229541 A1 | 7/2021 | Smith et al. | |
| 2021/0305641 A1 | 9/2021 | Bai et al. | |
| 2021/0305642 A1 | 9/2021 | Bai et al. | |
| 2021/0320349 A1 | 10/2021 | Jiang et al. | |
| 2021/0320372 A1 | 10/2021 | Jiang et al. | |
| 2021/0402863 A1 | 12/2021 | Huang et al. | |
| 2021/0408634 A1 | 12/2021 | Yin et al. | |
| 2022/0052414 A1 | 2/2022 | Huang et al. | |
| 2022/0052415 A1 | 2/2022 | Huang et al. | |
| 2022/0059897 A1 | 2/2022 | Huang et al. | |
| 2022/0059902 A1 | 2/2022 | Jiang et al. | |
| 2022/0077521 A1 | 3/2022 | Jin et al. | |
| 2022/0085450 A1 | 3/2022 | Chu et al. | |
| 2022/0102800 A1 | 3/2022 | Wang et al. | |
| 2022/0109211 A1 | 4/2022 | Wang et al. | |
| 2022/0123394 A1 | 4/2022 | Zhang et al. | |
| 2022/0123423 A1 | 4/2022 | Wang et al. | |
| 2022/0149458 A1 | 5/2022 | Jiang et al. | |
| 2022/0158296 A1 | 5/2022 | Chen et al. | |
| 2022/0185088 A1 | 6/2022 | Zhang et al. | |
| 2022/0190416 A1 | 6/2022 | Wu | |
| 2022/0190423 A1 | 6/2022 | Wu et al. | |
| 2022/0216555 A1 | 7/2022 | Huang et al. | |
| 2022/0221084 A1 | 7/2022 | Huang et al. | |
| 2022/0231370 A1 | 7/2022 | Yang et al. | |
| 2022/0231371 A1 | 7/2022 | Jiang et al. | |
| 2022/0255172 A1 | 8/2022 | Guo et al. | |

FOREIGN PATENT DOCUMENTS

| | | |
|---|---|---|
| CN | 107757374 A | 3/2018 |
| CN | 208738329 U | 4/2019 |
| CN | 209016158 U | 6/2019 |
| CN | 209045657 U | 6/2019 |
| CN | 110048042 A | 7/2019 |
| CN | 209071465 U | 7/2019 |
| CN | 209104196 U | 7/2019 |
| CN | 209104221 U | 7/2019 |
| CN | 209104222 U | 7/2019 |
| CN | 209104228 U | 7/2019 |
| CN | 209104229 U | 7/2019 |
| CN | 209104230 U | 7/2019 |
| CN | 209104232 U | 7/2019 |
| CN | 209104234 U | 7/2019 |
| CN | 209104235 U | 7/2019 |
| CN | 209104236 U | 7/2019 |
| CN | 209104237 U | 7/2019 |
| CN | 209104238 U | 7/2019 |
| CN | 209104242 U | 7/2019 |
| CN | 209104331 U | 7/2019 |
| CN | 209183581 U | 7/2019 |
| CN | 209183604 U | 7/2019 |
| CN | 209183605 U | 7/2019 |
| CN | 209183611 U | 7/2019 |
| CN | 209183612 U | 7/2019 |
| CN | 209183614 U | 7/2019 |
| CN | 209249637 U | 8/2019 |
| CN | 209357799 U | 9/2019 |
| CN | 209401679 U | 9/2019 |
| CN | 209401680 U | 9/2019 |
| CN | 209401682 U | 9/2019 |
| CN | 209401684 U | 9/2019 |
| CN | 209401715 U | 9/2019 |
| CN | 209447908 U | 9/2019 |
| CN | 110350256 A | 10/2019 |
| CN | 110416448 A | 11/2019 |
| CN | 209592271 U | 11/2019 |
| CN | 209607884 U | 11/2019 |
| CN | 209641720 U | 11/2019 |
| CN | 209710493 U | 11/2019 |
| CN | 209730104 U | 12/2019 |
| CN | 209747621 U | 12/2019 |
| CN | 209787546 U | 12/2019 |
| CN | 209843820 U | 12/2019 |
| CN | 209936788 U | 1/2020 |
| CN | 110931700 A | 3/2020 |
| CN | 210136922 U | 3/2020 |
| CN | 210136943 U | 3/2020 |
| CN | 210182435 U | 3/2020 |
| CN | 210566905 U | 5/2020 |
| CN | 111354885 A | 6/2020 |
| CN | 210744037 U | 6/2020 |
| CN | 111384314 B | 1/2021 |
| CN | 111384325 B | 2/2021 |
| CN | 112310525 A | 2/2021 |
| CN | 112331982 A | 2/2021 |
| CN | 109742281 B | 5/2021 |
| CN | 111354987 B | 5/2021 |
| CN | 111384337 B | 5/2021 |
| CN | 112331981 B | 9/2021 |
| CN | 112331997 B | 11/2021 |
| CN | 113871789 A | 12/2021 |
| CN | 112310541 B | 3/2022 |
| CN | 216054919 U | 3/2022 |
| CN | 216120549 U | 3/2022 |
| CN | 216120659 U | 3/2022 |
| CN | 216213898 U | 4/2022 |
| CN | 216354437 U | 4/2022 |
| CN | 216354439 U | 4/2022 |
| CN | 111430826 B | 6/2022 |
| CN | 216720168 U | 6/2022 |
| CN | 216720172 U | 6/2022 |
| CN | 216750072 U | 6/2022 |
| CN | 216750142 U | 6/2022 |
| CN | 216872085 U | 7/2022 |
| CN | 216903107 U | 7/2022 |
| CN | 216903128 U | 7/2022 |

(56) References Cited

FOREIGN PATENT DOCUMENTS

| | | |
|---|---|---|
| CN | 216903497 U | 7/2022 |
| DE | 102016119118 A1 | 4/2017 |
| DE | 102017121796 A1 | 3/2018 |
| DE | 102019108631 A1 | 10/2019 |
| DE | 102019125140 A1 | 3/2020 |
| DE | 102020124986 A1 | 3/2021 |
| DE | 102021101385 A1 | 9/2021 |
| EP | 3671904 A1 | 6/2020 |
| EP | 3671940 A1 | 6/2020 |
| EP | 3672377 A1 | 6/2020 |
| EP | 3675204 A1 | 7/2020 |
| EP | 3675207 A1 | 7/2020 |
| EP | 3675216 B1 | 7/2020 |
| EP | 3675217 A1 | 7/2020 |
| EP | 3675220 A1 | 7/2020 |
| EP | 3675221 A1 | 7/2020 |
| EP | 3675236 A1 | 7/2020 |
| EP | 3675271 A1 | 7/2020 |
| EP | 3798491 A1 | 3/2021 |
| EP | 3799150 A1 | 3/2021 |
| EP | 3799151 A1 | 3/2021 |
| EP | 3905366 A1 | 3/2021 |
| EP | 3806231 A1 | 4/2021 |
| EP | 3852187 A1 | 7/2021 |
| EP | 3920255 A1 | 8/2021 |
| EP | 3883005 A1 | 9/2021 |
| EP | 3883006 A1 | 9/2021 |
| EP | 3883042 A1 | 9/2021 |
| EP | 3886198 A1 | 9/2021 |
| EP | 3886200 A1 | 9/2021 |
| EP | 3886201 A1 | 9/2021 |
| EP | 3671893 B1 | 11/2021 |
| EP | 3699979 B1 | 11/2021 |
| EP | 3920315 A1 | 12/2021 |
| EP | 3930027 A1 | 12/2021 |
| EP | 3944397 A1 | 1/2022 |
| EP | 3944398 A1 | 1/2022 |
| EP | 3955333 A1 | 2/2022 |
| EP | 3799194 B1 | 3/2022 |
| EP | 3985787 A1 | 4/2022 |
| EP | 3799153 B1 | 6/2022 |
| GB | 238775 A | 8/1925 |
| JP | 2010246372 A | 10/2010 |
| KR | 1020100112530 A | 10/2010 |
| KR | 101695641 B1 | 1/2017 |

\* cited by examiner

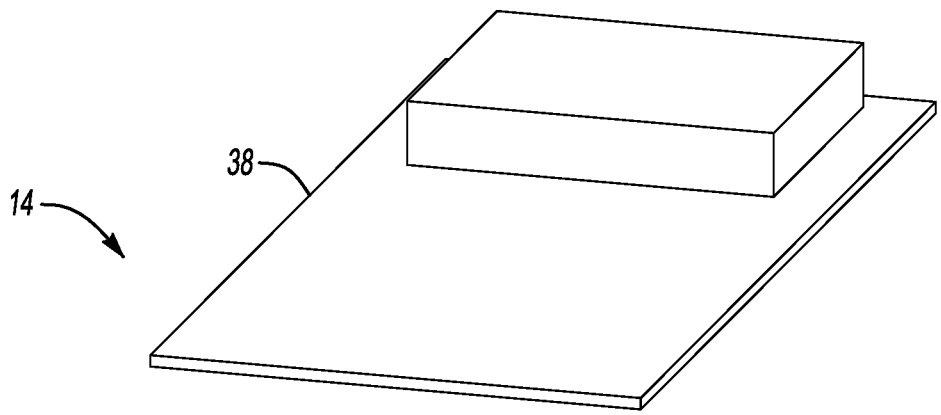
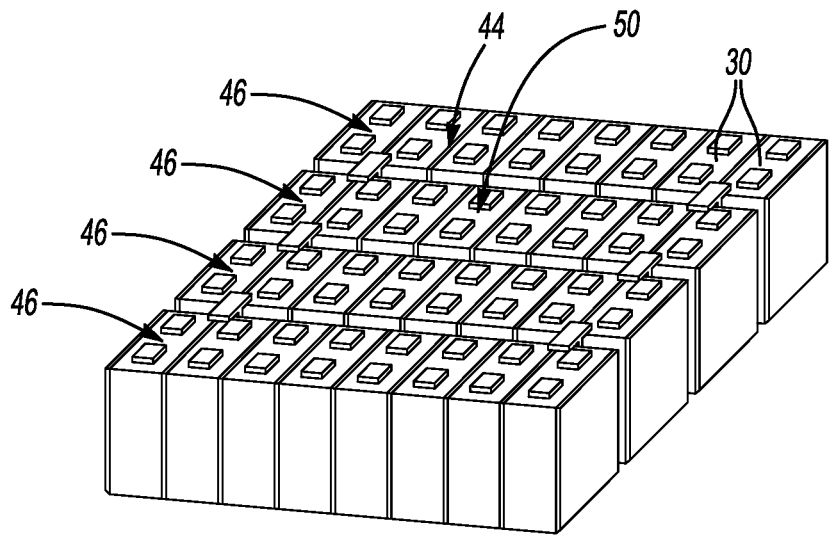
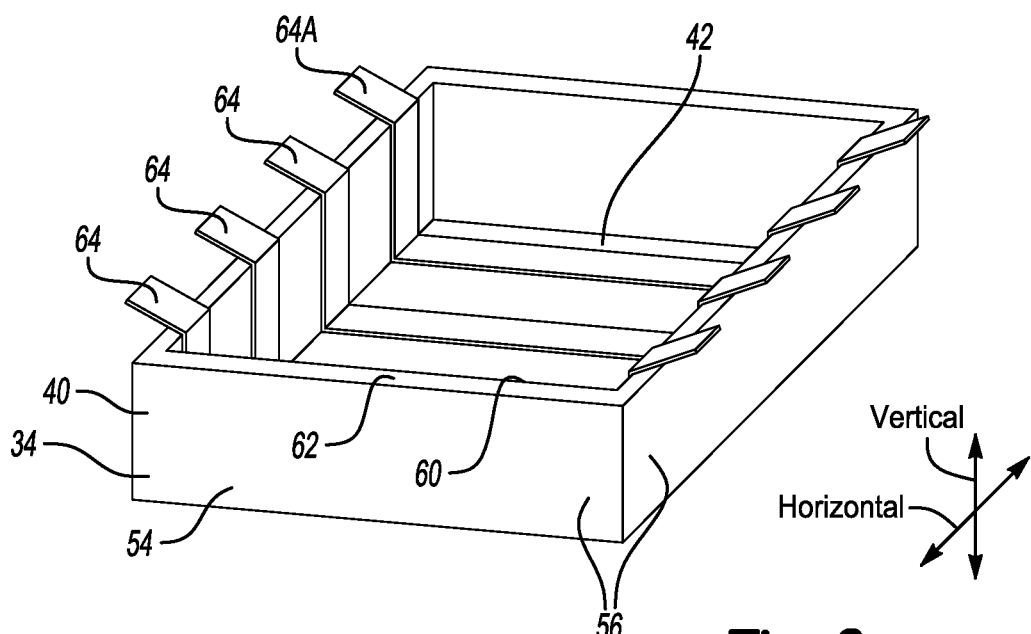
Fig-2

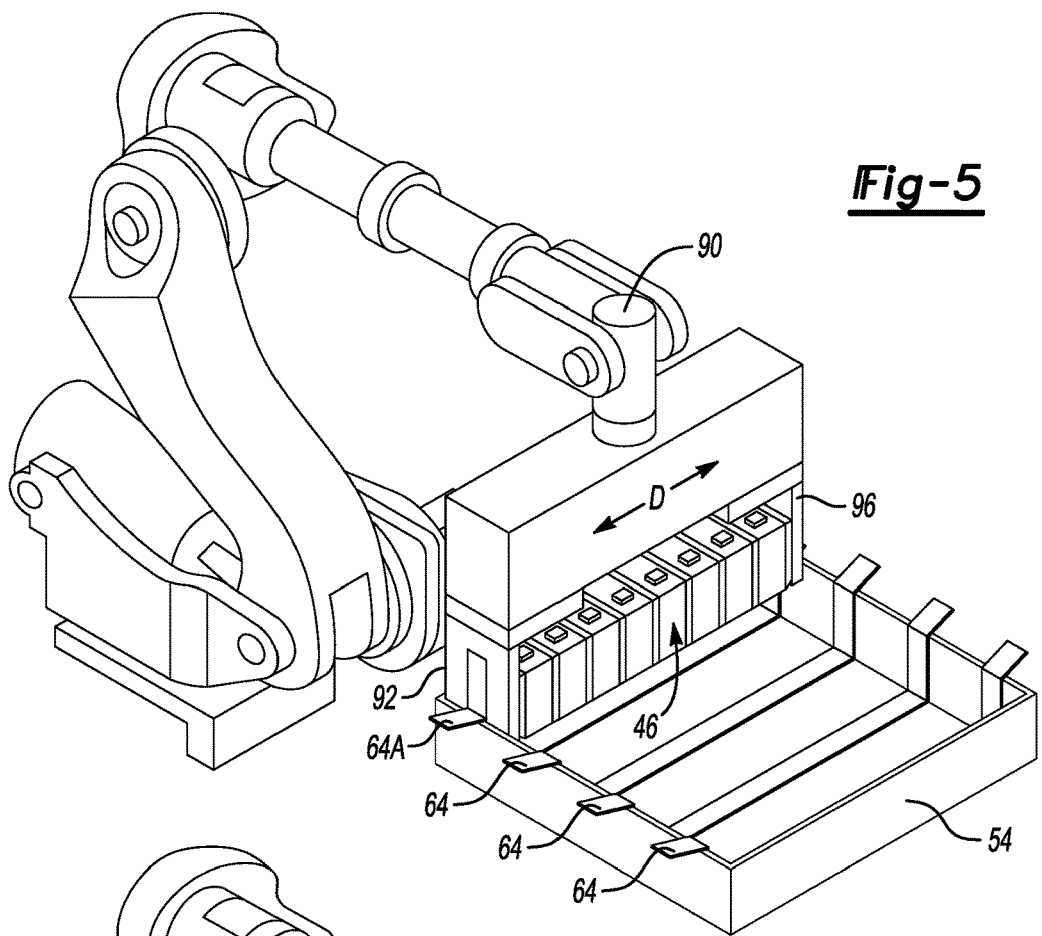
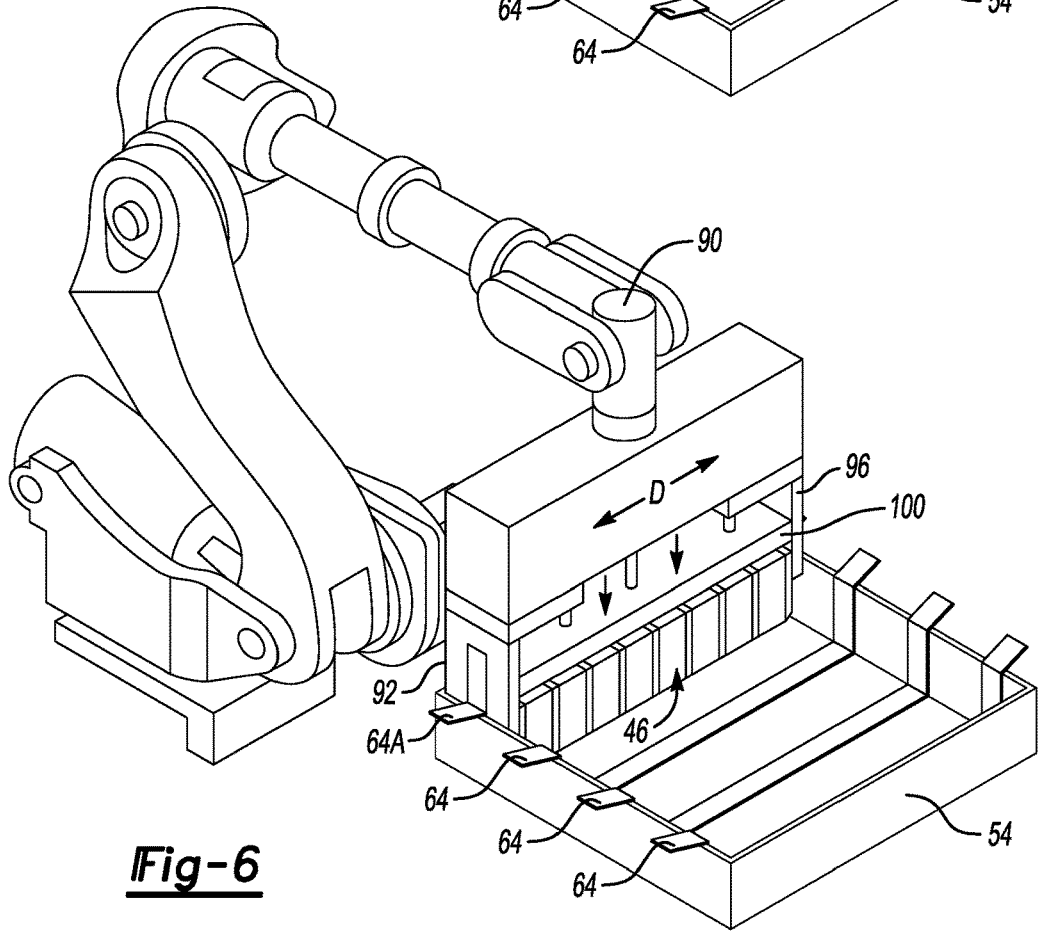

TRACTION BATTERY PACK CELL STACK REMOVAL METHOD AND BATTERY PACK ASSEMBLY

CROSS-REFERENCE TO RELATED APPLICATIONS

This application claims priority to U.S. Provisional Application No. 63/322,766, which was filed on 23 Mar. 2022 and is incorporated herein by reference

TECHNICAL FIELD

This disclosure relates generally to a method of removing battery cells from a traction battery pack and, more particularly, to removing battery cells from an enclosure structure that compresses the battery cells.

BACKGROUND

Electrified vehicles differ from conventional motor vehicles because electrified vehicles include a drivetrain having one or more electric machines. The electric machines can drive the electrified vehicles instead of, or in addition to, an internal combustion engine. A traction battery pack assembly can power the electric machines. The traction battery pack assembly of an electrified vehicle can include groups of battery cells.

SUMMARY

In some aspects, the techniques described herein relate to a battery pack cell stack removal method, including: compressing a cell stack with an enclosure structure when the cell stack is received within a cell-receiving opening of the enclosure structure; and pulling a cell stack removal strap to withdrawn the cell stack from the cell-receiving opening of the enclosure structure.

In some aspects, the techniques described herein relate to a method, wherein the cell stack is a first cell stack, and further including compressing a second cell stack with the enclosure structure when the first cell stack and the second cell stack are both receive within the cell-receiving opening of the enclosure structure.

In some aspects, the techniques described herein relate to a method, wherein, after the compressing and prior to the pulling, the cell stack removal strap is sandwiched between the cell stack and the enclosure structure.

In some aspects, the techniques described herein relate to a method, wherein the enclosure structure includes a plurality of side walls extending from a floor, the cell stack removal strap extending from a position against a first side wall on a first side of the enclosure structure to a second side wall on an opposite, second side of the enclosure structure.

In some aspects, the techniques described herein relate to a method, wherein the cell stack removal strap extends along the floor between the cell stack and the floor.

In some aspects, the techniques described herein relate to a method, wherein the cell stack includes a side that interfaces with a floor of the enclosure structure, the cell stack removal strap having a hoop section that contacts a perimeter of the side.

In some aspects, the techniques described herein relate to a method, wherein a portion of the hoop section extends past the perimeter of the side after the compressing and prior to the pulling.

In some aspects, the techniques described herein relate to a method, wherein a plurality of cells of the cell stack are compressed along an axis of the cell stack, wherein the pulling withdraws the cell stack form the enclosure structure in a direction that is perpendicular to the axis of the cell stack.

In some aspects, the techniques described herein relate to a method, wherein the enclosure structure directly contacts opposite axially facing sides of the cell stack when compressing the cell stack.

In some aspects, the techniques described herein relate to a method, wherein the enclosure structure is an enclosure tray.

In some aspects, the techniques described herein relate to a method, wherein the compressing of the cell stack is along an axis, wherein the pulling moves the cell stack relative to the enclosure structure in a direction that is perpendicular to the axis.

In some aspects, the techniques described herein relate to a method, further including inserting the cell stack and the cell stack removal cell stack removal strap together into the cell-receiving opening.

In some aspects, the techniques described herein relate to a method, wherein the enclosure structure circumferentially surrounds the cell stack during the compressing.

In some aspects, the techniques described herein relate to a battery pack assembly, including: an enclosure structure having a cell-receiving opening; a cell stack that is within the cell-receiving opening and is compressed by the enclosure structure; and a cell stack removal strap, at least a portion of the cell stack removal strap sandwiched between the enclosure structure and the cell stack.

In some aspects, the techniques described herein relate to a battery pack assembly, wherein the cell stack removal strap is sandwiched between a first wall of the enclosure structure and the cell stack, a floor of the enclosure structure and the cell stack, and an opposite, second wall of the enclosure structure and the cell stack.

In some aspects, the techniques described herein relate to a battery pack assembly, wherein the cell stack removal strap has a basket configuration with a hoop section and arms projecting outward from the hoop section.

In some aspects, the techniques described herein relate to a battery pack assembly, wherein the cell stack removal strap is a polyester fabric material.

In some aspects, the techniques described herein relate to a battery pack assembly, wherein the cell stack is a first cell stack and cell stack removal strap is a first cell stack removal strap, and further including a second cell stack and a second cell stack removal strap within the cell-receiving opening of the enclosure structure, at least a portion of the second cell stack removal strap sandwiched between the enclosure structure and the second cell stack.

In some aspects, the techniques described herein relate to a battery pack assembly, wherein the enclosure structure circumferentially surrounds the cell stack when compressing the cell stack.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows:

FIG. 2 illustrates a partially expanded view of a traction battery pack assembly from the electrified vehicle of FIG. 1 according to an exemplary aspect of the present disclosure.

FIG. 5 illustrates the cell stack of FIG. 4 just prior to inserting the cell stack into an enclosure halo of the traction battery pack.

FIG. 6 illustrates the cell stack of FIG. 4 after inserting the cell stack in the enclosure halo of the traction battery pack.

DETAILED DESCRIPTION

This disclosure details example traction battery pack assemblies having an enclosure that provides an interior area. Battery cells and electronic modules can be held within the interior area along with other components. The battery cells can be used to power an electric machine.

In particular, this disclosure details an exemplary systems and methods relating to removing battery cells from the enclosure. Removing battery cells may be required to service or replace battery cells, for example.

Figure 1:
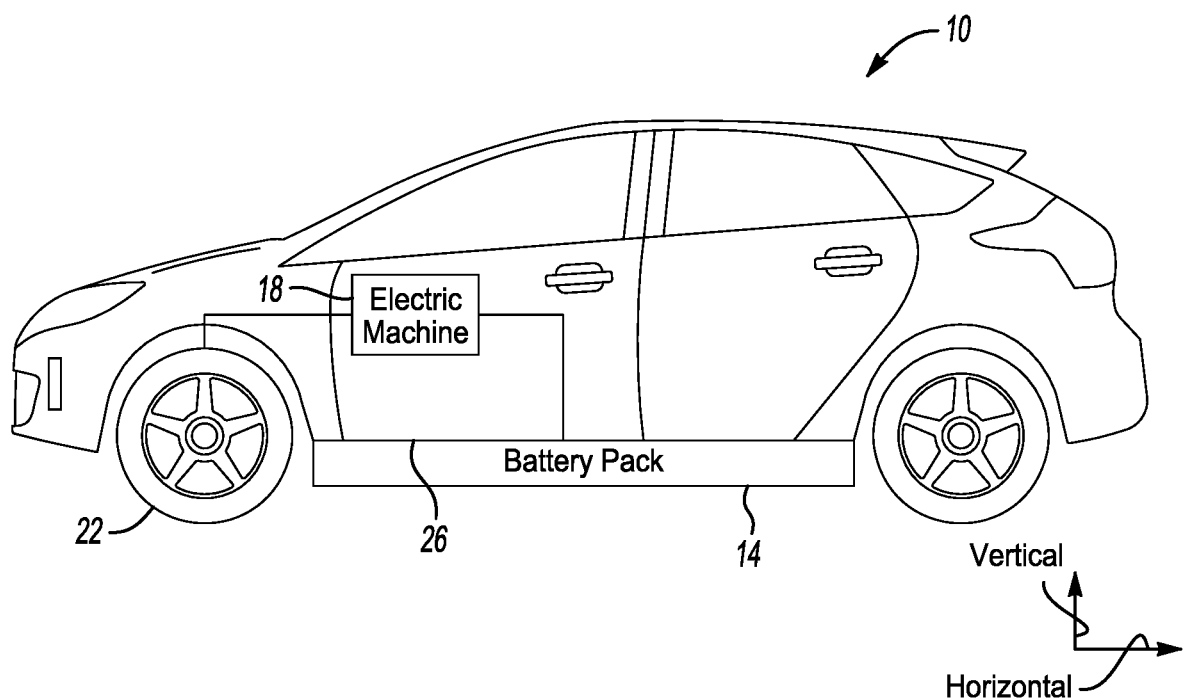
FIG. 1 illustrates a side view of an electrified vehicle.

With reference to FIG. 1, an electrified vehicle 10 includes a traction battery pack assembly 14, an electric machine 18, and wheels 22. The traction battery pack assembly 14 powers an electric machine 18, which can convert electrical power to mechanical power to drive the wheels 22. The traction battery pack assembly 14 can be a relatively high-voltage battery.

The traction battery pack assembly 14 is, in the exemplary embodiment, secured to an underbody 26 of the electrified vehicle 10. The traction battery pack assembly 14 could be located elsewhere on the electrified vehicle 10 in other examples.

The electrified vehicle 10 is an all-electric vehicle. In other examples, the electrified vehicle 10 is a hybrid electric vehicle, which selectively drives wheels using torque provided by an internal combustion engine instead of, or in addition to, an electric machine. Generally, the electrified vehicle 10 could be any type of vehicle having a traction battery pack.

With reference now to FIG. 2, the traction battery pack assembly 14 includes a plurality of battery cells 30 held within an enclosure assembly 34. In the exemplary embodiment, the enclosure assembly 34 comprises various enclosure structures. In particular, the example enclosure assembly 34 includes an enclosure cover 38, and enclosure halo 40, and an enclosure floor 42. The enclosure cover 38, enclosure halo 40, and enclosure floor 42 are secured together to provide an interior area 44 that houses the plurality of battery cells 30. In this example, the enclosure halo 40 and the enclosure floor 42 are different areas of an enclosure tray, which can be a stamped tub-like tray.

The plurality of battery cells (or simply, "cells") 30 are for supplying electrical power to various components of the electrified vehicle 10. The battery cells 30 are stacked side-by-side relative to one another to construct one of a plurality of cell stacks 46, which are positioned side-by-side to provide a cell matrix 50. In this example, each cell stack 46 includes eight individual battery cells 30, and the cell matrix 50 includes four cell stacks 46.

Although a specific number of battery cells 30 and cell stacks 46 are illustrated in the various embodiments of this disclosure, the traction battery pack assembly 14 could include any number of cells 30 and cell stacks 46. Each cell stack 46 could include a single cell 30, for example.

In some examples, utilizing an even quantity of battery cells 30 and an even quantity of cell stacks 46, which can help to support and efficient electrical bussing arrangement. In other words, this disclosure is not limited to the specific configuration of cells 30 shown in FIG. 2.

In an embodiment, the battery cells 30 are prismatic, lithium-ion cells. However, battery cells having other geometries (cylindrical, pouch, etc.) and/or chemistries (nickel-metal hydride, lead-acid, etc.) could alternatively be utilized within the scope of this disclosure.

The enclosure halo 40, in this example, includes a plurality of side walls 56 arranged relative to one another to provide a cell-receiving opening 60. The side walls 56 can be extruded, roll formed, cast, molded or other structures connected together by welding, fastening, or bonding, for example.

When the traction battery pack assembly 14 is assembled, the enclosure cover 38 can be secured to vertically upper side 62 of the enclosure halo 40. An interface between the enclosure cover 38 and the enclosure halo 40 extends circumferentially continuously about the interior area 44. Vertical, for purposes of this disclosure, is with reference to ground and a general orientation of the electrified vehicle 10 during operation.

When the traction battery pack assembly 14 is assembled, the cell matrix 50 is positioned within the cell-receiving opening 60. The example enclosure halo 40 includes one cell-receiving opening 60, but it should be understood that this disclosure also extends to enclosure assemblies providing more than one cell-receiving opening. The enclosure cover 38 can cover the cell matrix 50 within the cell-receiving opening 60 to substantially surround the cells 30 from all sides.

The enclosure halo 40 compresses and holds the cell matrix 50 when the cell matrix 50 is inserted into the cell-receiving opening 60 of the enclosure halo 40. In this example, the side walls 56 of the enclosure halo 40 apply forces to the cell matrix 50 when the cell matrix 50 is positioned within the cell-receiving opening 60.

The traction battery pack assembly 14 can be considered a cell-to-pack battery assembly. Unlike conventional traction battery pack battery assemblies, a cell-to-pack battery assembly incorporates battery cells or other energy storage devices into the enclosure assembly 34 without the cells being arranged in arrays or modules. The enclosure assembly 34 applies compressive forces to the cells. The cell-to-pack battery assembly may therefore eliminate most, if not all, of the array support structures used in conventional battery arrays (e.g., array frames, spacers, rails, walls, endplates, bindings, etc.) that are used to group and hold the battery cells within the arrays/modules.

The cell matrix 50 comprises a plurality of separate cell stacks 46, which are simultaneously inserted into the cell-receiving opening of the enclosure halo 40. To insert the example cell matrix 50 into the cell-receiving opening 60, the cells stacks 46 of the cell matrix 50 are compressed, and, while compressed, moved into place in the cell-receiving opening 60. The fixturing relied on the compress the cell stacks 46 is removed as the cell matrix 50 is inserted. The cell stacks 46 can expand somewhat within the enclosure assembly 34, but are still compressed by the enclosure assembly 34. When installed, the enclosure assembly 34, here the enclosure halo 40 provided by the side walls 56, directly contacts opposing axially facing sides of the cell stack 46 when compressing the cell stack 46.

The traction battery pack assembly 14 includes a plurality of cell stack removal straps 64 each sandwiched between one of the cell stacks 46 and the enclosure tray 54. Opposing end portions of the cell stack removal straps 64 are exposed when the cell matrix 50 is installed within the tray 54. These portions and can be grasped when the cover 38 is removed from the enclosure halo 40. Pulling one of the cell stack removal straps 64 can withdraw an associated one of the cell stacks 46 from the cell-receiving opening 60. Removing one or more of the cell stacks 46 may be necessary for service or repair. The straps 64, in this example, are a polyester fabric material. Other types of materials could be used for the straps in other examples including a thermally conductive strap if desirable to facilitate heat transfer through the strap thickness to a surface beyond.

An exemplary method of assembling the traction battery pack assembly 14 will now be explained in connection with FIGS. 3-8.

Figure 3:
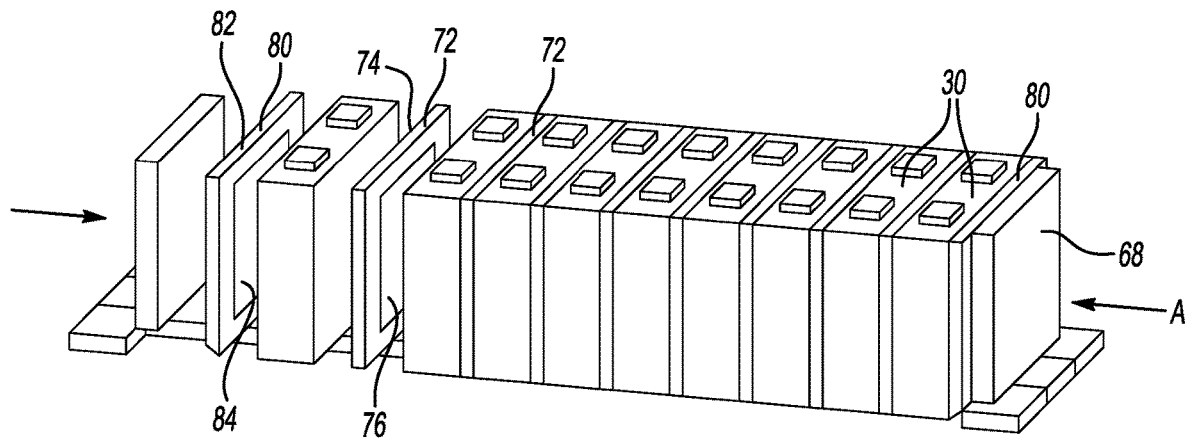
FIG. 3 illustrates a group of cells being compressed by a compression fixture to provide a cell stack for the traction battery pack assembly of FIG. 2.
Figure 4:
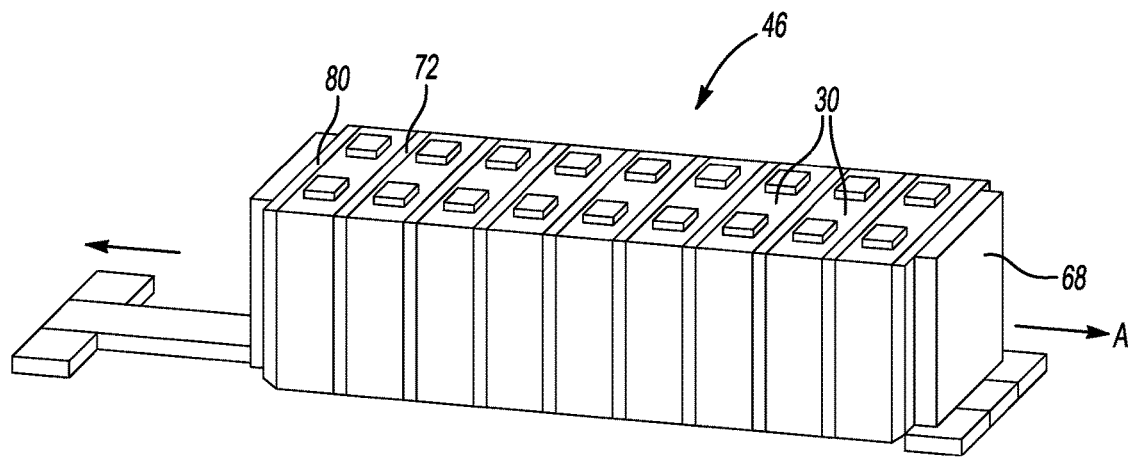
FIG. 4 illustrates the group of cells of FIG. 3 compressed by the compression fixture and providing the cell stack.

First, groups of cells 30 are compressed along a cell stack axis A as shown in FIGS. 3 and 4 to provide one of the cell stacks 46. In this example, a compression fixture 68 is used to compress the cells 30 along the cell stack axis A. The compressive force exerted on the cells 30 by the compression fixture 68 is 3 kilonewtons in some examples. An external unit can apply forces to the compression fixture 68 until reaching a position that applies the desired compressive force to the cell stack 46 along the cell stack axis A. The compression fixture 68 can then be locked in this position, and the external unit removed. The external unit could be a ball screw that presses against a die spring to move the compression fixture 68.

In this example, within the cells stacks 46, separator plates 72 are disposed between each of the cells 30 along the cell stack axis A. The separator plates 72 can include a frame portion 74 that holds a compressible material 76. The compressible material 76 can compress to permit some expansion of the cells 30. The compressible material 76 can be foam.

Within each of the cell stacks 46, slider plates 80 are disposed at opposing axial ends of the cells 30. The slider plates 80 include a frame portion 82 that holds a compressible material 84. The compressible material 84 can be foam. The compressible material 84 can compress to permit some expansion of the cells 30.

In the example method, this step is repeated four times to provide the four cell stacks 46 of the traction battery pack assembly 14. Each of the cell stacks 46 is compressed and held by a different compression fixture that mimics the compression fixture 68. Thus, four compression fixtures are used to provide the four cell stacks 46 of the example traction battery pack assembly 14.

Next, as shown in FIG. 5, the cell stack 46 is engaged by manufacturing equipment 90, which can maintain a compressive load on the cell stack 46 when engaging the cell stack 46. In this example, the manufacturing equipment 90 engages the cell stack 46 that was already compressed by a compression fixture, for example. In other examples, the manufacturing equipment 90 is responsible for applying the initial compressive forces to the group of cells 30 to provide the cell stack 46.

The example manufacturing equipment 90 is a 7-axis device. The example manufacturing equipment 90 includes, among other things, a first prong 92 and a second prong 96 that are used to directly engage the cell stack 46. The manufacturing equipment 90 can move the first prong 92 and the second prong 96 back-and-forth relative to each other along an axis D to selectively increase or decrease a distance between the first prong 92 and the second prong 96.

To engage the cell stack 46, the first prong 92 and the second prong 96 are each placed alongside a respective one of the load plates 80. The first prong 92 and the second prong 96 are then moved closer together to grip the load plates 80 and grasp the cell stack 46. While one first prong 92 and one second prong 96 is shown in this example, other examples could include more than one first prong and more than one second prongs.

In this example, after engaging the cell stack 46, the manufacturing equipment 90 moves to the position of FIG. 5 where the cell stack 46 is directly above the cell-receiving opening 60 of the enclosure structure, in particular, the cell-receiving opening 60 of the enclosure halo 40. One of the cell stack removal straps 64A lines the enclosure structure.

Next, as shown in FIG. 6, a pusher 100 of the manufacturing equipment 90 is transitioned from a retracted position to an extended position. Extending the pusher 100 slides the cell stack 46 relative to the first prong 92 and the second prong 96 and pushes the cell stack 46 into an installed position within the cell-receiving opening 60. The load plates 80 of the cell stack 46 slide relative to the first prong 92 and the second prong 96 when pushed by the pusher 112. In this example, the cell stack 46 is pushed and inserted into the cell-receiving opening 60 in a direction that is perpendicular to the axis A of the cell stack. The cell stack removal strap 64A is sandwiched between the cell stack 46 and the enclosure structure as the cell stack 46 is inserted.

The remaining cell stacks 46 of the matrix 50 are installed in a similar way with another stack removal strap 64 sandwiched between each of the cell stacks 46 and the floor 42 of the tray 54. The enclosure cover 38 can be secured to the enclosure tray 54 after the cell stacks 46 and other components, such as busbars, are positioned within the enclosure tray 54. The enclosure cover 38 can be secured using mechanical fasteners, for example. The traction battery pack assembly 14 can then be installed into the electrified vehicle 10 of FIG. 1.

In this example, the stack removal straps 64 are placed into the tray 54, and the cells stacks 46 then installed. In another example, the stack removal straps 64 are connected to the cell stacks 46 outside of the tray 54, and then inserted into the tray 54 as the cell stacks 46 are inserted. The straps 64 could be connected to the slider plates 80, for example.

From time to time, removing one or more of the cell stacks 46 from the enclosure may be required. For example, removing one or more of the cell stacks 46 may be required if the traction battery pack assembly 14 does not pass an inspection of busbar welds after assembly.

Figure 7:
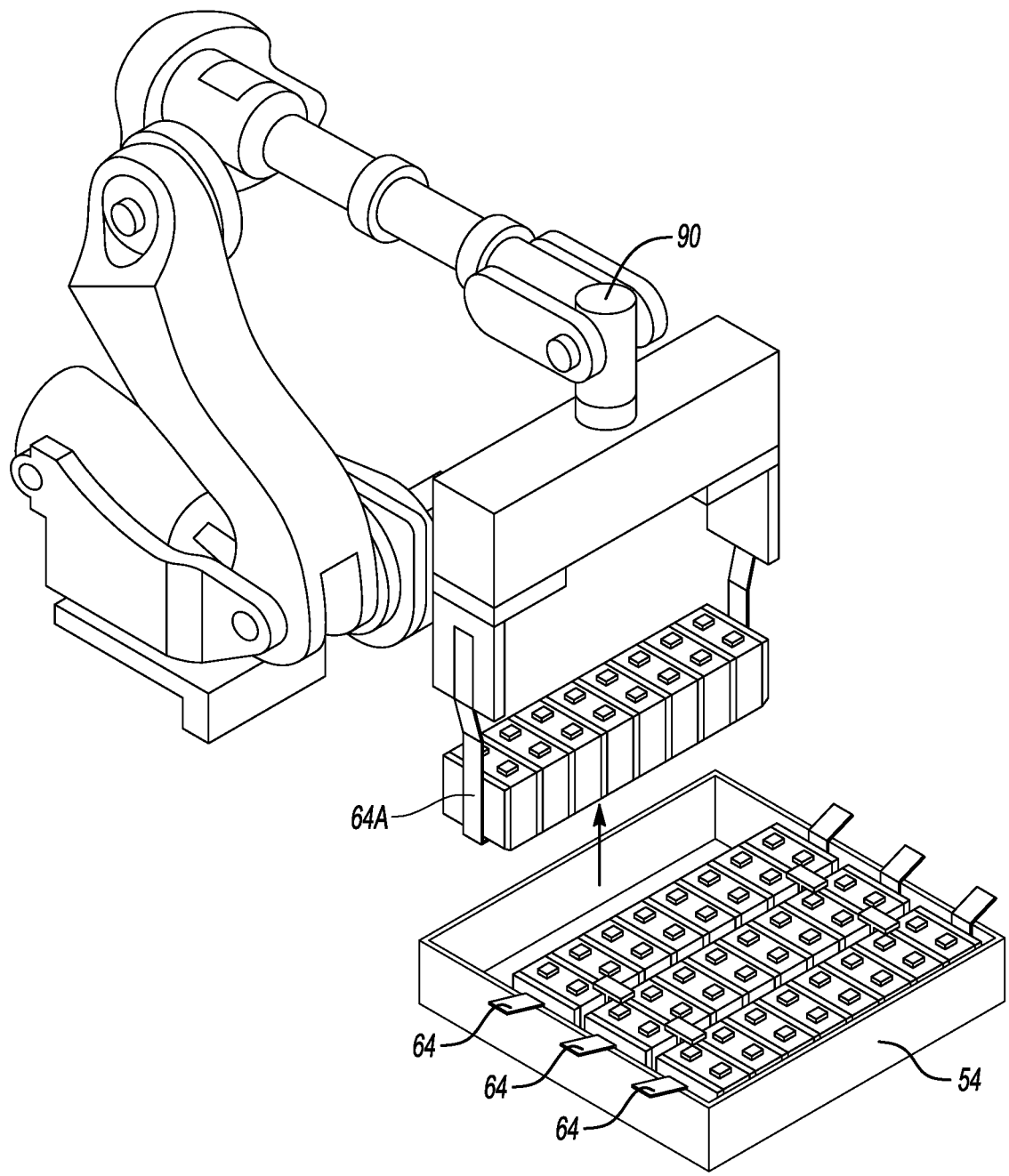
FIG. 7 illustrates the cell stack of FIG. 6 after using a cell stack removal strap to remove the cell stack.
Figure 8:
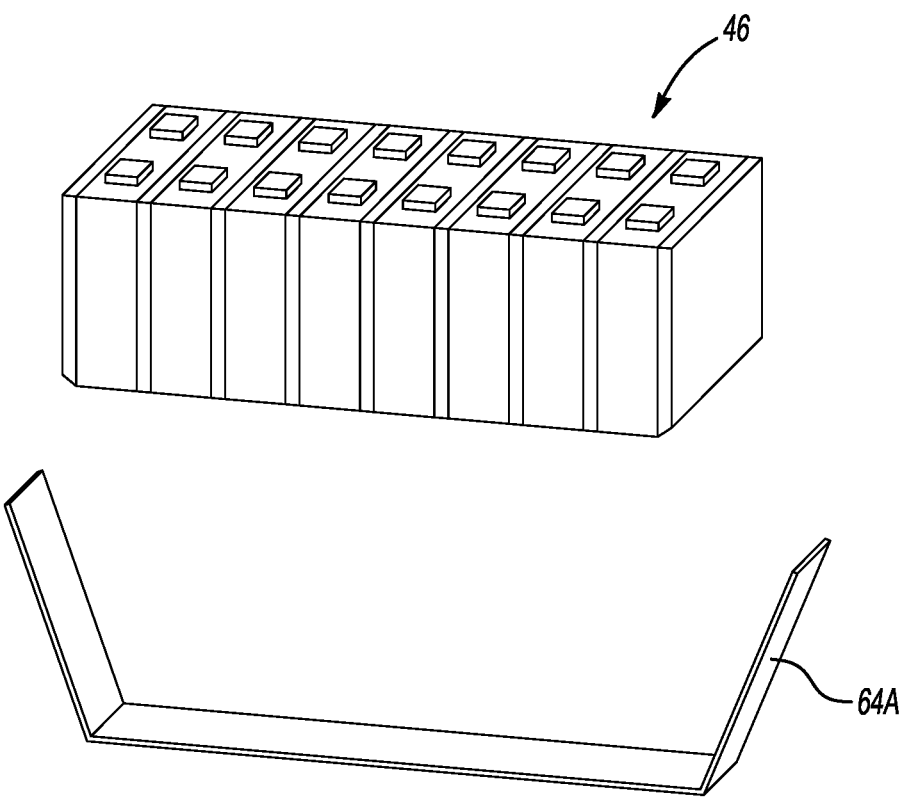
FIG. 8 illustrates a partially expanded view of the cell stack and the cell stack removal strap of FIGS. 5 to 7.
Figure 9:
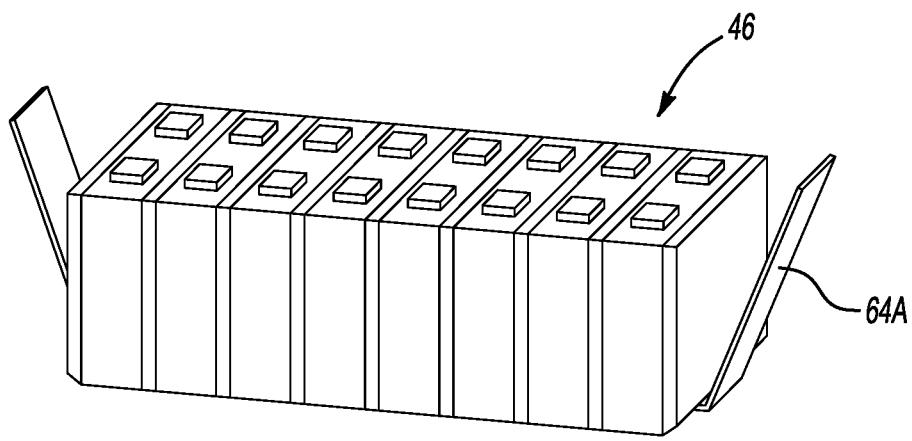
FIG. 9 illustrates the cell stack placed against the cell stack removal strap of FIG. 8.

In this example, the cell stack removal straps 64 can be used to remove the cell stacks 46. As shown in FIGS. 7 to 9, the manufacturing equipment 90 can engage opposing end portions of the strap 64A and then pulls the cell stack removal strap 64A to withdraw the respective cell stack 46 out of the enclosure tray 54. The cell stacks 46 are pulled upward when removed in this example, which is perpendicular to a direction that the cell stacks 46 are compressed.

If required, that cell stack 46 can then be replaced with another cell stack. The manufacturing equipment 90 that engages the strap 64A to lift the cell stack 46 can be the same type of manufacturing equipment that was used to install the cell stacks 46. In another example, a different type of manufacturing equipment could be used.

The manufacturing equipment 90 can engage the opposing ends of the strap 64A in various ways. The manufacturing equipment could use clamps, hooks, ties, etc. to engage the opposing ends of the strap 64A. A person skilled in the art and having the benefit of this disclosure would understand other ways to engage a strap with manufacturing equipment.

Figure 10:
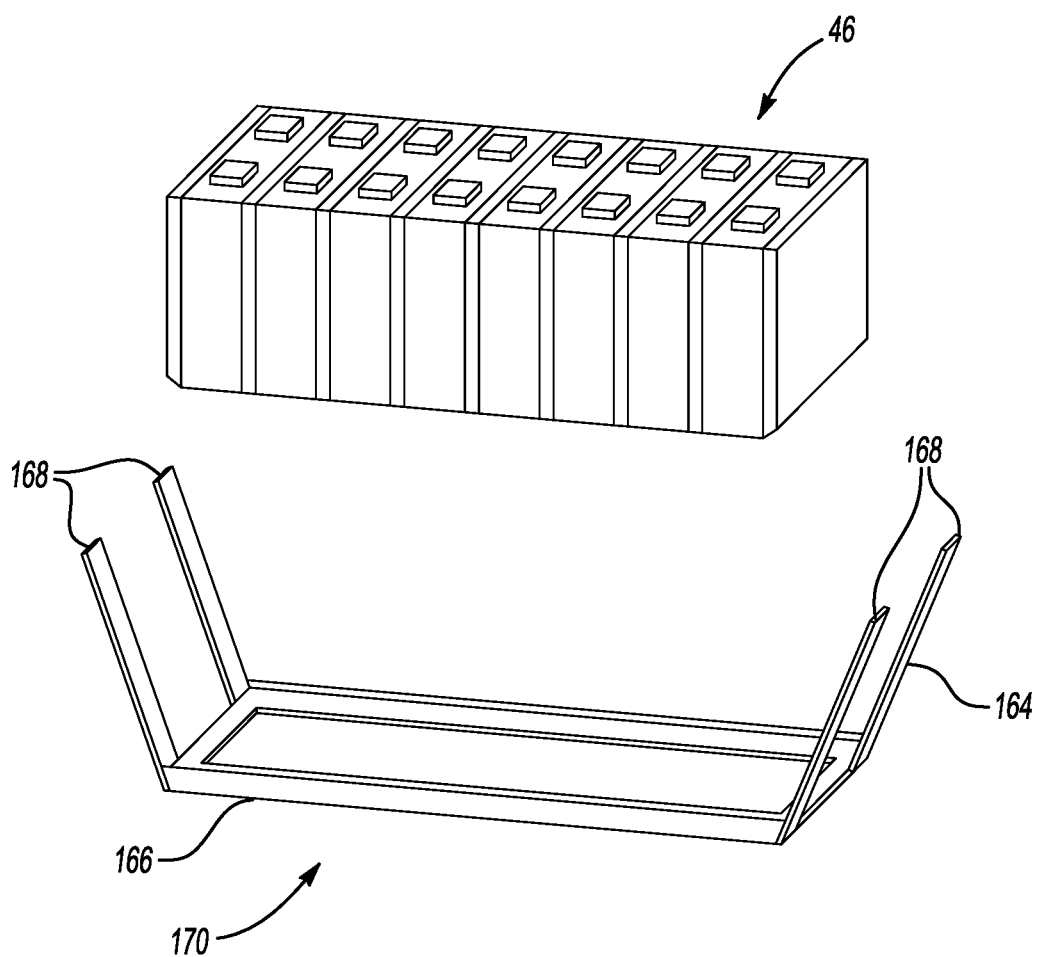
FIG. 10 illustrates a partially expanded view of the cell stack and a cell stack removal strap according to another exemplary aspect of the present disclosure.
Figure 11:
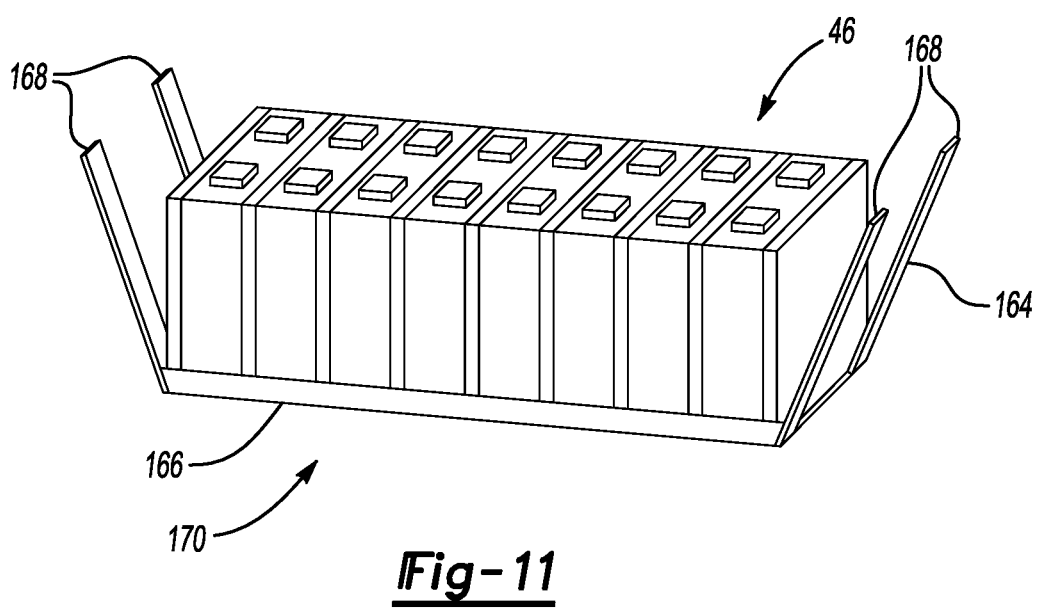
FIG. 11 illustrates the cell stack placed against the cell stack removal strap of FIG. 10.

FIGS. 10 and 11 illustrate a cell stack removal strap 164 according to another exemplary embodiment. The cell stack removal strap 164 has a basket configuration and includes a hoop section 166 and arm sections 168 projecting from the hoop section 166. When installed with one of the cell stacks 46, the hoop section 166 contacts a perimeter of a bottom side 170 of the cell stack 46. The hoop section 166 can wrap around the corners of the bottom side 170 in some examples. That is portions of the hoop section 166 can extend outward past the perimeter. The cell stack removal strap 164 can more evenly distributes forces across the bottom side 170 than the straps 64, which can facilitate a stabilized withdrawing of the cell stack 46 when the cell stack removal strap 164 is pulled to withdrawn the cell stack 46.

In the example basket configuration, the wrapping of the hoop section 166 extends portions of the hoop section 166 vertically upward around the sides of the cell stack 46 along a length of the cell stack 46. The wrapping is in contrast to the example of FIGS. 8 and 9 where the example strap 64a does not wrap up around the sides of the cell stack 46. The wrapping of the hoop section 166 can enhance stability and potentially enable the strap 164 to be made thinner where the strap 164 extends underneath the cell stack 46. The basket configuration and its hoop section 166 can, in some examples, act as a thickness control/compression limiter for the cell stack to cold plate gap (if there is a cold plate beneath the cell stack). A thermal interface material could be designed to compress to approximately the same thickness as the portions of the strap 164 extending beneath the cell stack 46. The cell stack removal strap 164 could have different thickness, or could maintain a consistent thickness throughout.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A battery pack cell stack removal method, comprising:
    compressing a cell stack with an enclosure structure when the cell stack is received within a cell-receiving opening of the enclosure structure; and
    pulling a cell stack removal strap to withdraw the cell stack from the cell-receiving opening of the enclosure structure.

2. The method of claim 1, wherein the cell stack is a first cell stack, and further comprising compressing a second cell stack with the enclosure structure when the first cell stack and the second cell stack are both received within the cell-receiving opening of the enclosure structure.

3. The method of claim 1, wherein, after the compressing and prior to the pulling, the cell stack removal strap is sandwiched between the cell stack and the enclosure structure.

4. The method of claim 1, wherein the enclosure structure includes a plurality of side walls extending from a floor, the cell stack removal strap extending from a position against a first side wall on a first side of the enclosure structure to a second side wall on an opposite, second side of the enclosure structure.

5. The method of claim 4, wherein the cell stack removal strap extends along the floor between the cell stack and the floor.

6. The method of claim 4, wherein the cell stack includes a side that interfaces with the floor of the enclosure structure, the cell stack removal strap having a hoop section that contacts a perimeter of the side.

7. The method of claim 6, wherein a portion of the hoop section extends past the perimeter of the side after the compressing and prior to the pulling.

8. The method of claim 1, wherein a plurality of cells of the cell stack are compressed along an axis of the cell stack, wherein the pulling withdraws the cell stack from the enclosure structure in a direction that is perpendicular to the axis of the cell stack.

9. The method of claim 8, wherein the enclosure structure directly contacts opposite axially facing sides of the cell stack when compressing the cell stack.

10. The method of claim 1, wherein the enclosure structure is an enclosure tray.

11. The method of claim 1, wherein the compressing of the cell stack is along an axis, wherein the pulling moves the cell stack relative to the enclosure structure in a direction that is perpendicular to the axis.

12. The method of claim 1, further comprising inserting the cell stack and the cell stack removal strap together into the cell-receiving opening.

13. The method of claim 1, wherein the enclosure structure circumferentially surrounds the cell stack during the compressing.

14. The method of claim 1, wherein the cell stack removal strap has a basket configuration with a hoop section and arms projecting outward from the hoop section.

15. A battery pack assembly, comprising:
    an enclosure structure having a cell-receiving opening;
    a cell stack that is within the cell-receiving opening and is compressed by the enclosure structure; and
    a cell stack removal strap, at least a portion of the cell stack removal strap sandwiched between the enclosure structure and the cell stack.

16. The battery pack assembly of claim 15, wherein the cell stack removal strap is sandwiched between a first wall of the enclosure structure and the cell stack, a floor of the enclosure structure and the cell stack, and an opposite, second wall of the enclosure structure and the cell stack.

17. The battery pack assembly of claim 15, wherein the cell stack removal strap is a polyester fabric material.

18. The battery pack assembly of claim 15, wherein the cell stack is a first cell stack and cell stack removal strap is a first cell stack removal strap, and further comprising a second cell stack and a second cell stack removal strap within the cell-receiving opening of the enclosure structure, at least a portion of the second cell stack removal strap sandwiched between the enclosure structure and the second cell stack.

19. The battery pack assembly of claim 15, wherein the enclosure structure circumferentially surrounds the cell stack when compressing the cell stack.

20. A battery pack assembly, comprising:
- an enclosure structure having a cell-receiving opening;
- a cell stack that is within the cell-receiving opening and is compressed by the enclosure structure; and
- a cell stack removal strap, at least a portion of the cell stack removal strap sandwiched between the enclosure structure and the cell stack,
- wherein the cell stack removal strap has a basket configuration with a hoop section and arms projecting outward from the hoop section.

* * * * *